United States Patent [19]

Pompei et al.

[11] Patent Number: 5,199,436

[45] Date of Patent: *Apr. 6, 1993

[54] RADIATION DETECTOR HAVING IMPROVED ACCURACY

[75] Inventors: Francesco Pompei, Wellesley Hills; Philip R. Gaudet, Jr., Concord, both of Mass.

[73] Assignee: Exergen Corporation, Newton, Mass.

[ * ] Notice: The portion of the term of this patent subsequent to Feb. 19, 2008 has been disclaimed.

[21] Appl. No.: 646,855

[22] Filed: Jan. 28, 1991

Related U.S. Application Data

[60] Division of Ser. No. 338,968, Apr. 14, 1989, Pat. No. 5,012,813, which is a continuation-in-part of Ser. No. 280,546, Dec. 6, 1988, Pat. No. 4,993,419.

[51] Int. Cl.$^5$ ............................................. A61B 6/00
[52] U.S. Cl. ..................................... 128/664; 128/736
[58] Field of Search ................ 128/664, 736; 374/123, 374/127, 129, 132–133, 135

[56] References Cited

U.S. PATENT DOCUMENTS

| | | |
|---|---|---|
| 2,658,390 | 11/1953 | Machler . |
| 3,273,395 | 9/1966 | Schwartz ............................. 73/355 |
| 3,282,106 | 11/1966 | Barnes . |
| 3,491,596 | 1/1970 | Dean . |
| 3,581,570 | 6/1971 | Wortz . |
| 3,777,568 | 12/1973 | Risgin et al. ......................... 73/355 |
| 3,878,836 | 4/1975 | Twentier . |
| 3,933,045 | 1/1976 | Fox et al. ............................. 73/359 |
| 3,949,740 | 4/1976 | Twentier . |
| 4,005,605 | 2/1977 | Michael . |
| 4,062,239 | 12/1977 | Fowler et al. . |
| 4,456,390 | 6/1984 | Junkert et al. . |
| 4,566,808 | 1/1986 | Pompei et al. . |
| 4,602,642 | 7/1986 | O'Hara et al. . |
| 4,614,442 | 9/1986 | Poncy . |
| 4,626,686 | 12/1986 | Pompei et al. ...................... 374/128 |
| 4,634,294 | 1/1987 | Christol et al. . |
| 4,636,091 | 1/1987 | Pompei et al. . |
| 4,662,360 | 5/1987 | O'Hara et al. . |
| 4,684,018 | 8/1987 | Jarund . |
| 4,722,612 | 2/1988 | Junkert et al. . |
| 4,784,149 | 11/1988 | Berman et al. . |
| 4,790,324 | 12/1988 | O'Hara et al. . |
| 4,797,840 | 1/1989 | Fraden ................................ 128/736 |
| 4,831,258 | 5/1989 | Paulk et al. . |
| 4,895,164 | 1/1990 | Wood . |
| 5,018,872 | 5/1991 | Suszynski et al. ................. 374/133 |

FOREIGN PATENT DOCUMENTS

| | | |
|---|---|---|
| 0201790 | 11/1986 | European Pat. Off. . |
| 1914468 | 11/1970 | Fed. Rep. of Germany . |
| 0092535 | 10/1983 | Sweden . |
| 1226540 | 12/1967 | United Kingdom . |
| 1425765 | 3/1973 | United Kingdom . |

OTHER PUBLICATIONS

Houdas et al., *Human Body Temperature* (Plenum Press: NY), 83.
Det Tronics advertisement, *InTech*, Oct. 1987, p. 48.
Dexter Research Center product description for the Model 1M Thermopile Detector, Oct. 1980.
Proceedings of the Eighth Annual Conference of the IEEE/ Engineering in Medicine and Biology Society, Nov. 7–10, 1986, vol. 3 of 3, pp. 1606–1608.
Fraden, Jacob, "Application of Piezo/Pyroelectric Films in Medical Transducer" Journal of Clinical Engineering, Mar./Apr. 1988, pp. 133–138.
Looney, Joseph M. Jr. and Pompei, Francisco, *Ear Thermometry*, Reprinted from Medical Electronics, Jun. 1989.

*Primary Examiner*—Kyle L. Howell
*Assistant Examiner*—John P. Lacyk
*Attorney, Agent, or Firm*—Hamilton, Brook, Smith & Reynolds

[57] ABSTRACT

Tympanic temperature measurements are obtained from the output of a thermopile mounted in an extension from a housing. The housing has a temperature display thereon and supports the electronics for responding to sensed radiation. The thermopile is mounted in a highly conductive can which includes a radiation guide and thermal mass. The guide provides a narrow field of view due to a fairly high emissivity. Electronics determine the target temperature as a function of the temperature of the hot junction of the thermopile determined from the cold junction temperature and a thermopile coefficient. The tympanic temperature is adjusted to provide an indication of core temperature.

5 Claims, 7 Drawing Sheets

5,199,436

RADIATION DETECTOR HAVING IMPROVED ACCURACY

RELATED APPLICATION

This application is a division of application Ser. No. 07/338,968, filed Apr. 14, 1989, now U.S. Pat. No. 5,012,813, which is a continuation-in-part of application Ser. No. 07/280,596, filed Dec. 6, 1988, now U.S. Pat. No. 4,993,419.

BACKGROUND

Radiation detectors which utilize thermopiles to detect the heat flux from target surfaces have been used in various applications. An indication of the temperature of a target surface may be provided as a function of the measured heat flux. One such application is the testing of electrical equipment. Another application has been in the scanning of cutaneous tissue to locate injured subcutaneous regions. An injury results in increased blood flow which in turn results in a higher surface temperature. Yet another application is that of tympanic temperature measurement. A tympanic device relies on a measurement of the temperature of the tympanic membrane area in the ear of an animal or human by detection of infrared radiation as an alternative to traditional sublinqual thermometers.

SUMMARY OF THE INVENTION

An improved tympanic temperature measurement device is presented in parent U.S. patent application No. 07/280,546 That device provides for accuracy within one-tenth of a degree over limited ranges of ambient temperature and accuracy to within one degree over a wide range of ambient temperatures. An object of the present invention is to provide a tympanic temperature measurement device which would provide accuracy to within one-tenth degree over a wide range of ambient temperatures. In obtaining that accuracy, an object of the invention was to continue to avoid any requirement for a reference target or for control of the temperature of the thermopile as such requirements had resulted in complexity and difficulties in prior tympanic temperature measurement devices.

A radiation detector comprises a thermopile and a can enclosing the thermopile. The can structure includes an elongated radiation guide of a first internal diameter. The radiation guide extends from a viewing window to a rear volume of larger internal diameter in which the thermopile is mounted. The guide may be gold plated.

In accordance with one feature of the present invention, the portions of the can forming the radiation guide and rear volume are formed in a unitary structure of high thermal conductivity material. The can structure has an outer surface with an outer diameter at its end adjacent to the window which is less than an outer diameter about the rear volume. The outer surface is tapered about the radiation guide such that a unitary thermal mass of increasing outer diameter is provided about the end of the radiation guide adajacent to the rear volume. The unitary can structure maximizes conductance and thermal mass within a limited diameter. To avoid changes in fixtures used in mounting the thermopile within the can, the unitary can of limited diameter may be supplemented with an additional thermal mass which surrounds the rear volume and a portion of the unitary thermal mass and which is in close thermal contact with the can structure.

It has been found that a narrow field of view radiation detector provides a more accurate reading of tympanic temperature. In the detector of the present invention, that field of view is obtained by controlling the reflectance of the surface of the radiation guide, the length of the guide and the position of the thermopile behind the guide. A field of view of less than about sixty degrees allows for viewing of only a portion of the ear canal within about 1.5 centimeters of the tympanic membrane.

Accuracy of the detector may be improved electronically as well. Accordingly, an electronic circuit is coupled to a thermopile, having a cold junction and a hot junction mounted to view a target, and to a temperature sensor for sensing the temperature of the cold junction. The electronic circuit is responsive to the voltage across the thermopile and a temperature sensed by the temperature sensor to determine the temperature of the target. The electronic circuit determines the temperature of the target as a function of the temperature of the hot junction of the thermopile determined from the cold junction temperature and a known thermopile coefficient. A display provides an indication of the target temperature determined by the electronic circuit.

As in prior systems, the electronic circuit determines target temperature from the relationship $T_T^4 = (KH) + T^4$, where $T_T$ is the target temperature, K is a gain factor, H is a sensed voltage from the thermopile and T is a junction temperature of the thermopile. In accordance with the present invention in a preferred embodiment, the junction temperature is the temperature of the hot junction. The hot junction temperature $T_H$ is determined from the sensed thermopile voltage and cold junction temperature and a thermopile coefficient. The thermopile coefficient is specified at a predetermined temperature and is temperature compensated by the electronic circuit as a function of a temperature between the hot and cold junctions, specifically the average temperature. Further, the electronic circuit determines the gain factor K as a function of the difference between a calibration temperature and a temperature between the hot and cold junction temperatures.

When used to measure a biological temperature, the radiation detector is further improved by providing an indication of an internal temperature within biological tissue. The electronic circuit determines the internal temperature by adjusting a measured temperature of surface tissue for ambient temperature. In particular, the biological surface tissue may be tympanic membrane or the ear canal adjacent to the membrane, and the display may provide an indication of core temperature.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF A PREFERRED EMBODIMENT

Figure 1:
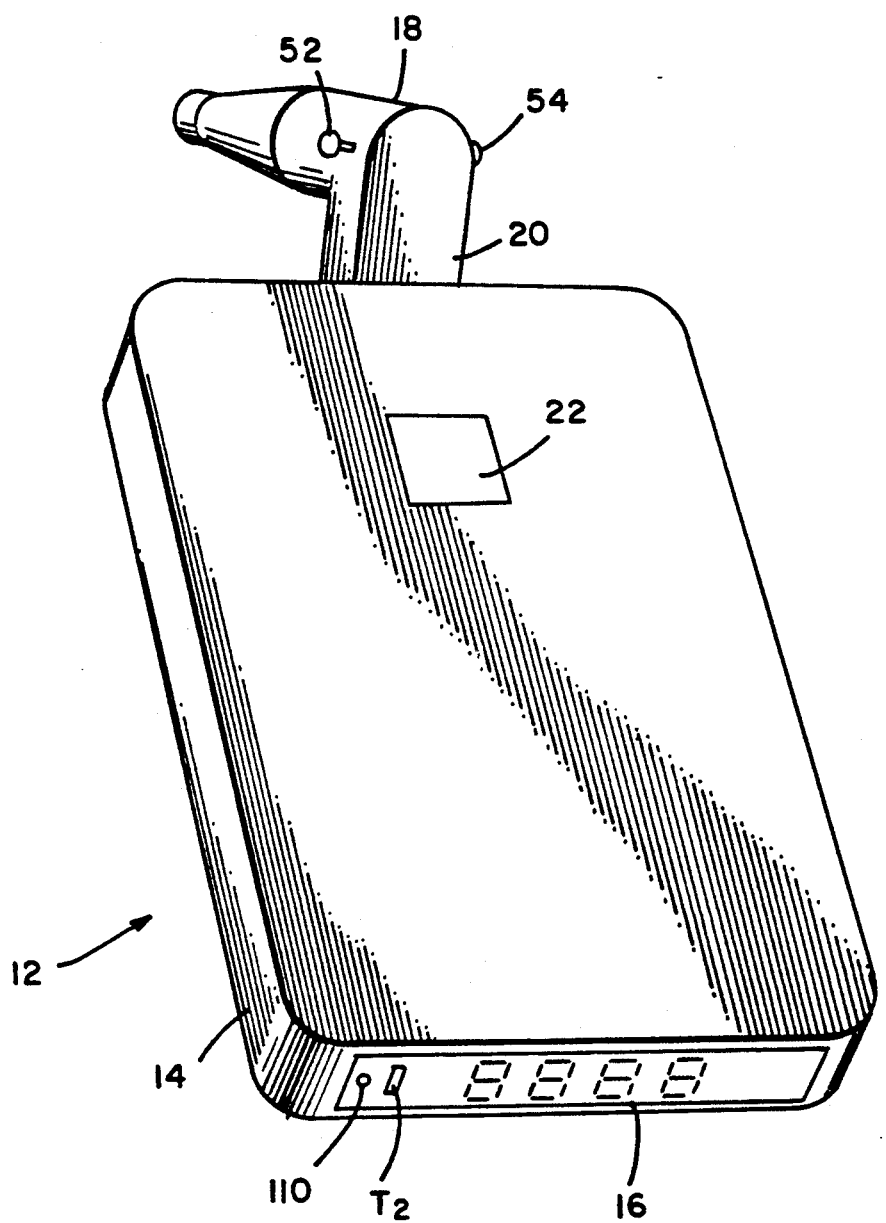
FIG. 1 illustrates a radiation detector for tympanic temperature measurements in accordance with the present invention.

The radiation detector 12 of FIG. 1 includes a flat housing 14 with a digital display 16 for displaying a tympanic temperature measurement. Although the display may be located anywhere on the housing, it is preferred that it be positioned on the end so the user is not inclined to watch it during a measurement. The instrument makes an accurate measurement when rotated to scan the ear canal, and the user should concentrate on only the scanning motion. Then the display can be read A thermopile radiation sensor is supported within a probe 18 at the opposite end of the housing 14. The extension 18 extends orthogonally from an intermediate extension 20 which extends at an angle of about 15 degrees from the housing 14. As such, the head of the detector including the extension 18 and 20, has the appearance of a conventional otoscope. An on/off switch 22 is positioned on the housing.

Figure 2:
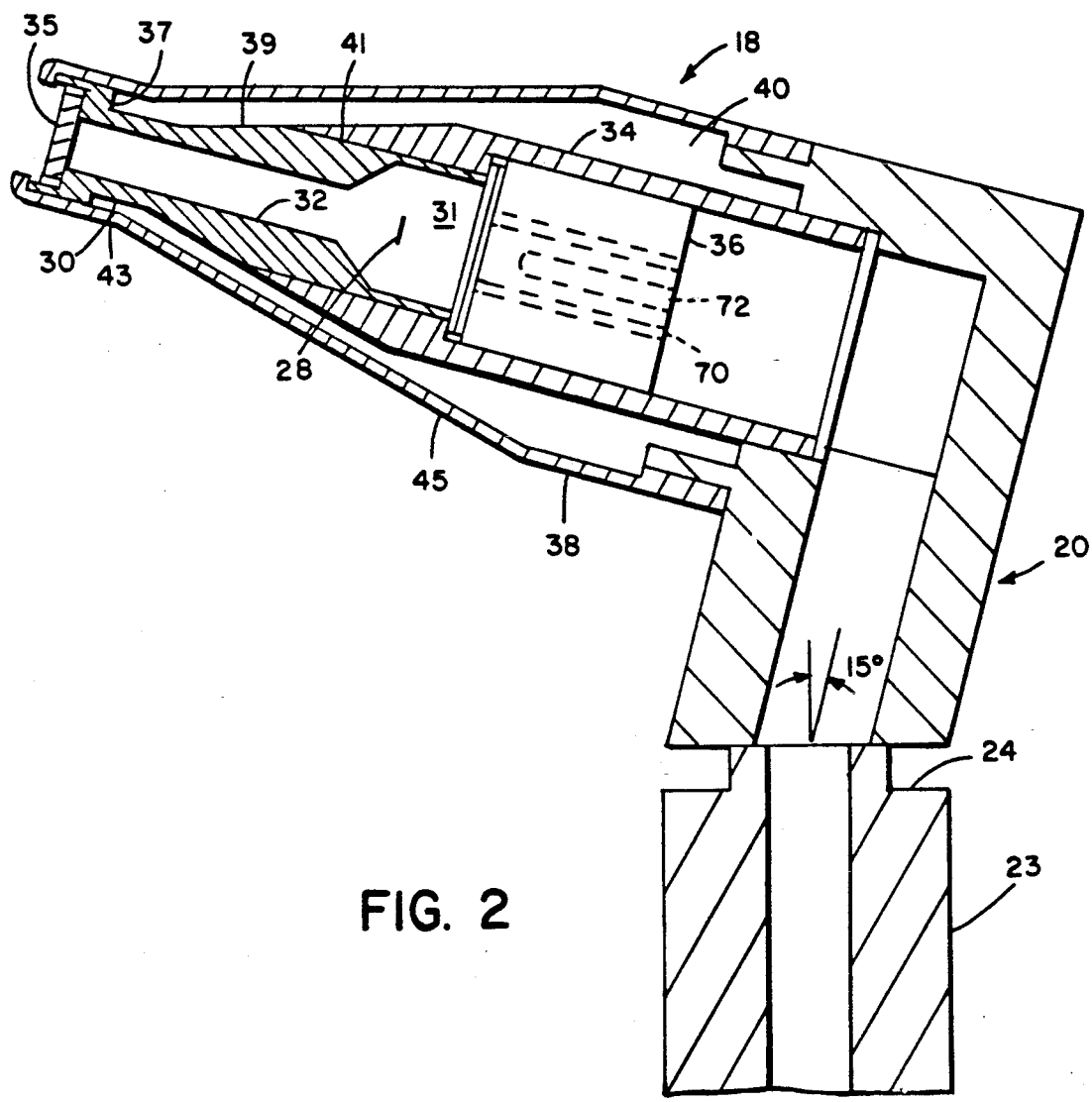
FIG. 2 is a cross-sectional view of the extension of the detector of FIG. 1 in which the thermopile radiation sensor is positioned.

A cross-sectional view of the extension of the detector is illustrated in FIG. 2. A base portion 22 is positioned within the housing 14, and the housing clamps about a groove 24. As noted, the portion 20 extends at about a 15 degree angle from the housing and thus from the base portion 22. The extension 18 is tapered toward its distal end at 26 so that it may be comfortably positoned in the ear to view the tympanic membrane and/or ear canal.

A preferred disposable element to be used over the extension 18 is presented in parent U.S. patent application No. 07/280.546 and will not be discussed here.

The edge at the end of the probe is rounded so that when the probe is inserted into the ear it can be rotated somewhat without discomfort to the patient. The probe is also curved like an otoscope to avoid interference with the ear. By thus rotating the probe, the ear canal is scanned and, at some orientation of the probe during that scan, one can be assured that the maximum temperature is viewed. Since the ear canal cavity leading to the tympanic area is the area of highest temperature, the instrument is set in a peak detection mode, and the peak detected during the scan is taken as the tympanic temperature.

An improved assembly within the extension 18 is illustrated in FIG. 2. A thermopile 28 is positioned within a can 30 of high conductivity material such as copper. The conductivity should be greater than two watts per centimeter per degree Kelvin. The can is filled with a gas of low thermal conductivity such as Xenon. The thermopile 28 is positioned within a rear volume. 31 It is mounted to an assembly which includes a flange 33. The volume is sealed by cold welding of the flange 33 to a flange 41 extending from the can. Cold welding is the preferred approach to making the seal and, to utilize past welding fixtures, the outer diameter of the can is limited.

The thermopile views the tympanic membrane area through a radiation guide 32. The radiation guide 32 is gold plated to minimize oxidation. It is closed at its forward end by a germanium window 35. To minimize expense, the window is square with each side slightly longer than the diameter of the radiation guide 32. The window is cemented with epoxy within a counterbore in a flange 37 at the end of the radiation guide. The epoxy serves as a gas seal and mechanical support for the somewhat brittle germanium window. The flange serves to protect the germanium window should the detector be dropped. The diagonal of the window is less than the diameter of the counterbore, and its thickness is less than the depth of the counterbore. Therefore, if the detector is dropped, any force which presses the plastic housing toward the window is absorbed by the flange. The germanium need only withstand the forces due to its own inertia.

Whereas the detector disclosed in the parent application had a wide field of view of about 120°, it has been determined that a significantly narrower field of view of about sixty degrees or less provides a more accurate indication of tympanic temperature. With a narrower field of view, the thermopile flake, when directly viewing the tympanic membrane, also views no more than about 1.5 centimeters along the ear canal and preferably less than one centimeter. A better view of the tympanic membrane also results from the cylindrical extension 43 beyond the conical portion of the extension 18. With the ear canal straightened by the probe, the extension 43 can extend well into the ear canal beyond any hair at the canal opening.

The tympanic membrane is about 2.5 centimeters from the opening of the ear canal. The conical portion of the extension 18 prevents the tip of the extension from extending more than about eight millimeters into the ear canal. Beyond that depth, the patient suffers noticeable discomfort. With a field of view of about sixty degrees, the ear canal which is about eight millimeters wide is viewed about eight millimeters from the tip of the extension 18. Thus, only the ear canal within about 1.5 centimeters of the tympanic membrane is viewed as the radiation guide is directed toward the membrane. The result is a more accurate reading of the tympanic temperature which is closer to core temperature.

With the present instrument, the narrow field of view is obtained by two changes to the prior radiation guide. The reflectivity within the guide is reduced. Radiation entering the tube at greater angles must be reflected a greater number of times from the radiation guide before reaching the thermopile flake. With the higher emissivity, such radiation is less likely to reach the flake to be detected. The field of view is further decreased by extending the enlarged rear volume between the flake and the radiation guide. Radiation which enters the radiation guide at greater angles, yet travels through the radiation guide, leaves the guide at greater angles and is thus unlikely to be viewed by the flake. The length of the radiation guide is another parameter which affects the field of view. By using a planoconvex lens as the window 35, the field of view can be further limited.

Both of the above approaches to decreasing the field of view increase the amount of heat which is absorbed by the can in which the thermopile is mounted. The added heat load adds to the importance that the can, including the radiation guide, have a large thermal mass and high thermal conductivity as discussed below.

As distinguished from the structure presented in the parent application, the volume 31 surrounding the thermopile and the radiation guide are formed of a single piece of high conductivity copper. This unitary construction eliminates any thermal barriers between the foremost end of the radiation guide and the portion of the can surrounding the thermopile which serves as the cold junction of the thermopile. Further, at least a portion of added thermal mass which surrounds the radiation guide is unitary with the can as well. Specifically, a taper 39 results in an enlarged region 41 which serves as a thermal mass in accordance with the principals of the parent application. The taper 39 continues along a conductive thermal mass 34 which surrounds the can and a conductive plug 36. Both the mass 34 and plug 36 are of copper and are in close thermal contact with the can 30.

The outer sleeve 38 of the extension 18 and the intermediate extension 20 are of plastic material of low thermal conductivity. The sleeve 38 is separated from the can 30 and thermal mass 34 by an insulating air space 40. The taper of the can 30 and thermal mass 34 permits the insulating space to the end of the extension while minimizing the thermal resistance from the end of the tube 32 to the thermopile, a parameter discussed in detail below. The inner surface of the plastic sleeve 38 may be coated with a good thermal conductor to distribute across the entire sleeve any heat received from contact with the ear. Twenty mils of copper coating would be suitable.

In contrast with the prior design, the portion of the sleeve 38 at the foremost end of extension 18 has a region 43 of constant outer diameter before a tapered region 45. The region of constant outer diameter reduces the outer diameter at the distal end and minimizes interference when rotating the extension in the ear to view the tympanic membrane area. The tapered region is spaced six millimeters from the end of the extension to allow penetration of the extension into the ear canal by no more than about eight millimeters.

One of the design goals of the device was that it always be in proper calibration without requiring a warm-up time. This precluded the use a heated target in a chopper unit or heating of the cold junction of the thermopile as was suggested in the O'Hara et al. U.S. Pat. No. 4,602,642. To accomplish this design goal, it is necessary that the system be able to operate with the thermopile at any of a wide range of ambient temperatures and that the thermopile output have very low sensitivity to any thermal perturbations.

The output of the thermopile is a function of the difference in temperature between its warm junction, heated by radiation, and its cold junction which is in close thermal contact with the can 30. In order that the hot junction respond only to radiation viewed through the window 35, it is important that the radiation guide 32 be, throughout a measurement, at the same temperature as the cold junction. To that end, changes in temperature in the guide 32 must be held to a minimum, and any such changes should be distributed rapidly to the cold junction to avoid any thermal gradients. To minimize temperature changes, the tube 32 and the can 30 are, of course, well insulated by means of the volume of air 40. Further, a high conductance thermal path is provided to the cold junction. This conductance is enhanced by the unitary construction. Further, the can 30 is in close thermal communication with the thermal masses 34 and 36, and the high conductivity and thickness of the thermal masses increase the thermal conductance. A high thermal conductivity epoxy, solder or the like joins the can and thermal masses. The solder or epoxy provides a significant reduction in thermal resistance. Where solder is used, to avoid damage to the thermopile which is rated to temperatures of 125° C. a low temperature solder of indium-tin alloy which flows at 100° C. is allowed to flow into the annular mass 34 to provide good thermal coupling between all elements.

The thermal resistance from the outer surface of the plastic sleeve 38 to the conductive thermal mass is high to minimize thermal perturbations to the inner thermal mass. To minimize changes in temperature of the guide 32 with any heat transfer to the can which does occur, the thermal mass of the can 30, annular mass 34 and plug 36 should be large. To minimize thermal gradients where there is some temperature change in the tube during measurement, the thermal resistance between any two points of the thermal mass should be low.

Thus, due to the large time constant of the thermal barrier, any external thermal disturbances, such as when the extension contacts skin, only reach the conductive thermal mass at extremely low levels during a measurement period of a few seconds; due to the large thermal mass of the material in contact with the cold junction, any such heat transfer only causes small changes in temperature; and due to the good thermal conductance throughout the thermal mass, any changes in temperature are distributed quickly and are reflected in the cold junction temperature quickly so that they do not affect temperature readings.

The thermal RC time constant for thermal conduction through the thermal barrier to the thermal mass and tube should be at least two orders of magnitude greater than the thermal RC time constant for the temperature response of the cold junction to heat transferred to the tube and thermal mass. The RC time constant for conduction through the thermal barrier is made large by the large thermal resistance through the thermal barrier and by the large thermal capacitance of the thermal mass. The RC time constant for response of the cold junction is made low by the low resistance path to the cold junction through the highly conductive copper can and thermal mass, and the low thermal capacitance of the stack of beryllium oxide rings and pin conductors to the thermopile.

Although the cold junction capacitance is naturally low, there are size constraints in optimizing the thermal capacitance of the thermal mass, the thermal resistance through the thermal barrier and the internal thermal resistance. Specifically, the external thermal resistance can be increased by increased radial dimensions, the capacitance of the thermal mass can be increased by increasing its size, and the thermal resistance through the longitudinal thermal path through the tube can be decreased by increasing its size. On the other hand, the size must be limited to permit the extension to be readily positioned and manipulated within the ear.

Besides the transfer of heat from the environment, another significant heat flow path to the conductive thermal mass is through leads to the system. To minimize heat transfer through that path, the leads are kept to small diameters. Further, they are embedded in the plug 36 through bores 70; thus, any heat brought into the system through those leads is quickly distributed throughout the thermal mass, and only small changes in temperature and small gradients result.

Because the temperature of the thermal mass is not controlled, and the response of the thermopile 28 is a function of its cold junction temperature, the cold junction temperature must be monitored. To that end, a thermistor is positioned at the end of a central bore 72 in the plug 36.

Figure 3:
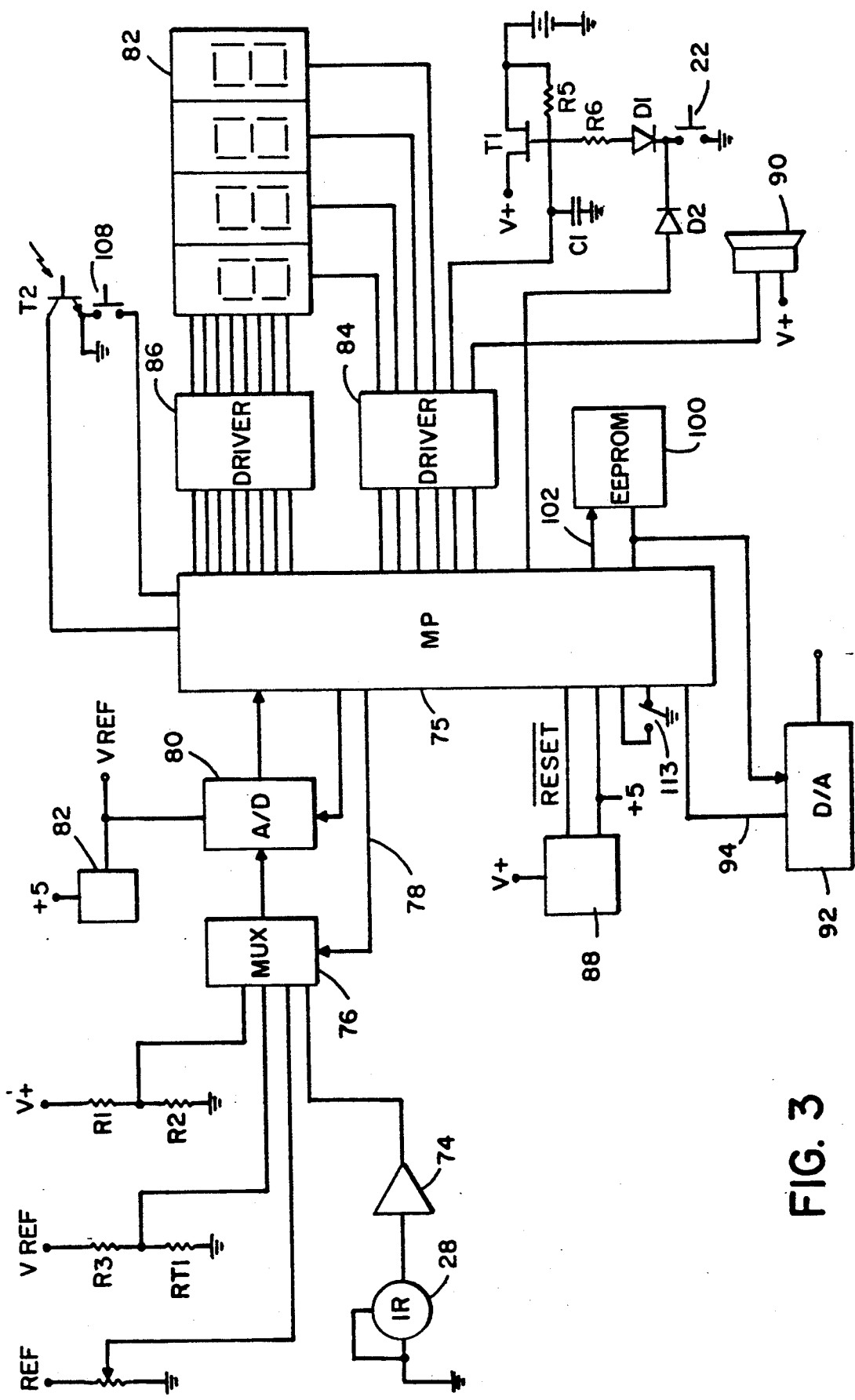
FIG. 3 is a block diagram of the electronic circuit of the detector of FIG. 1.

A schematic illustration of the electronics in the housing 14, for providing a temperature readout on display 16 in response to the signal from the thermopile, is presented in FIG. 3. The system is based on a microprocessor 73 which processes software routines included in read only memory within the processor chip The processor may be a 6805 processor sold by Motorola.

The voltage generated across the thermopile 28 due to a temperature differential between the hot and cold junctions is amplified in an operational amplifier 74. The analog output from the amplifier 74 is applied as one input to a multiplexer 76. Another input to the multiplexer 76 is a voltage taken from a voltage divider R1, R2 which is indicative of the potential V+ from the power supply 78. A third input to the multiplexer 76 is the potential across a thermistor RT1 mounted in the bore 72 of block 36. The thermistor RT1 is coupled in a voltage divider circuit with R3 across a reference potential VRef. The final input to the multiplexer is a potential taken from a potentiometer R4 which may be adjusted by a user. The system may be programmed to respond to that input in any of a number of ways. In particular, the potentiometer may be used as a gain control or as a DC offset control.

At any time during the software routine of the microprocessor 73, one of the four inputs may be selected by the select lines 78. The selected analog signal is applied to a multiple slope analog system 80 used by the microprocessor in an integrating analog-to-digital conversion 80. The subsystem 80 may be a TSC500A sold by Teledyne. It utilizes the reference voltage VRef from a reference source 82. The microprocessor 73 responds to the output from the convertor 80 to generate a count indicative of the analog input to the convertor.

The microprocessor drives four 7-segment LED displays 82 in a multiplexed fashion Individual displays are selected sequentially through a column driver 84, and within each selected display the seven segments are controlled through segment drivers 86.

When the switch 22 on the housing is pressed, it closes the circuit from the battery 78 through resistors R5 and R6 and diode D1 to ground. The capacitor C1 is quickly charged and field effect transistor T1 is turned on. Through transistor T1 the V+ potential from the storage cell 78 is applied to a voltage regulator 86. The regulator 86 provides the regulated +5 volts to the system. It also provides a reset signal to the microprocessor. The reset signal is low until the +5 volt reference is available and thus holds the microprocessor in a reset state. When the +5 volts is available, the reset signal goes high, and the microprocessor begins its programmed routine.

When the switch 22 is released, it opens its circuit, but a charge is maintained on capacitor C1 to keep transistor T1 on. Thus, the system continues to operate. However, the capacitor C1 and transistor T1 provide a very simple watchdog circuit. Periodically, the microprocessor applies a signal through driver 84 to the capacitor C1 to recharge the capacitor and thus keep the transistor T1 on. If the microprocessor should fail to continue its programmed routine, it fails to charge the capacitor C1 within a predetermined time during which the charge on C1 leaks to a level at which transistor T1 turns off. Thus, the microprocessor must continue in its programmed routine or the system shuts down. This prevents spurious readings when the processor is not operating properly.

With transistor T1 on, the switch 22 can be used as an input through diode D2 to the microprocessor to initiate any programmed action of the processor.

In addition to the display, the system has a sound output 90 which is driven through the driver 84 by the microprocessor.

In order to provide an analog output from the detector, a digital-to-analog convertor 92 is provided. When selected by line 94, the convertor converts serial data on line 96 to an analog output made available to a user.

Both calibration and characterization data required for processing by the microprocessor may be stored in an electrically erasable programmable read only memory (EEPROM) 100. The EEPROM may, for example, be a 93c46 sold by International CMOS Technologies. Inc. The data may be stored in the EEPROM by the microprocessor when the EEPROM is selected by line 102. Once stored in the EEPROM. the data is retained even after power down. Thus, though electrically programmable, once programmed the EEPROM serves as a virtually nonvolatile memory.

Prior to shipment, the EEPROM may be programmed through the microprocessor to store calibration data for calibrating the thermistor and thermopile. Further, characterization data which defines the personality of the infrared detector may be stored. For example, the same electronics hardware, including the microprocessor 73 and its internal program, may be used for a tympanic temperature detector in which the output is accurate in the target temperature range of about 60° F. to a 110° F. or it may be used as an industrial detector in which the target temperature range would be from about 0° F. to 100° F. Further, different modes of operation may be programmed into the system. For example, several different uses of the sound source 90 are available.

Proper calibration of the detector is readily determined and the EEPROM is readily programmed by means of an optical communication link which includes a transistor T2 associated with the display. A communication boot may be placed over the end of the detector during a calibration/characterization procedure. A photodiode in the boot generates a digitally encoded optical signal which is filtered and applied to the detector T2 to provide an input to the microprocessor 73. In a reverse direction, the microprocessor, may communicate optically to a detector in the boot by flashing specific segments of the digital display 82. Through that communication link, an outside computer 106 can monitor the outputs from the thermistor and thermopile and perform a calibration of the devices. A unit to be calibrated is pointed at each of two black body radiation sources while the microprocessor 73 converts the signals and sends the values to the external computer. The computer is provided with the actual black body temperatures and ambient temperature in the controlled environment of the detector, computes calibration variables and returns those variable to be stored in the detector EEPROM. Similarly, data which characterizes a particular radiation detector may be communicated to the microprocessor for storage in the EEPROM.

A switch 108 is positioned behind a hole 110 (FIG. 1) in the radiation detector so that it may be actuated by a rigid metal wire or pin. Through that switch, the user may control some specific mode of operation such as converting the detector from degrees Fahrenheit to degrees centigrade. That mode of operation may be stored by the microprocessor 73 in the EEPROM so that the detector continues to operate in a specific mode until a change is indicated by closing the switch 108.

A switch 106 may be provided either internally or through the housing to the user to set a mode of operation of the detector. By positioning the switch at either the lock position, the scan position or a neutral position, any of three modes may be selected. The first mode is the normal scan mode where the display is updated continuously. A second mode is a lock mode where the display locks after a selectable delay and then remains frozen until power is cycled or, optionally, the power-on button is pushed. The sound source may be caused to sound at the time of lock. The third mode is the peak mode where the display reads the maximum value found since power-on until power is cycled or, optionally, the power-on button is pushed.

The processor determines when the voltage from the divider R1, R2 drops below each of two thresholds. Below the higher threshold, the processor periodically enables the sound source to indicate that the battery is low and should be replaced but allows continued readout from the display. Below the lower threshold, the processor determines that any output would be unreliable and no longer displays temperature readings. The unit would then shut down upon release of the power button.

In the present system, the target temperature is computed from the relationship $$T_T^4 = Kh(H - H_o) + T_H^4 \quad (1)$$

where $T_T$ is the target temperature, Kh is a gain calibration factor, H is the radiation sensor signal which is offset by $H_o$ such that $(H - H_o) = 0$ when the target is at the cold junction temperature of the device to counter any electronic offsets in the system, and $T_H$ is the hot junction temperature. This relationship differs from that previously used in that Kh is temperature compensated relative to the average temperature of the thermopile rather than the cold junction, or ambient, temperature. Further, the hot junction temperature rather than the cold junction temperature is referenced in the relationship.

The gain calibration factor Kh is temperature compensated by the relationship, $$Kh = G\left(1 - Tco\left(\frac{T_H - T_C}{2} - Tz\right)\right) \quad (2)$$

where G is an empirically determined gain in the system. Tco is the temperature coefficient of the Seebeck coefficient of the thermopile and Tz is the temperature at which the instrument was calibrated. The use of the average temperature of the thermopile rather than the cold junction temperature provides for a much more accurate response where a target temperature is significantly different from the ambient temperature.

As noted, the relationship by which the target temperature is determined includes the hot junction temperature as the second term rather than the cold junction temperature. Hot junction temperature is computed from the relationship $$V_s = J \alpha_{tav}(T_H - T_C) \quad (3)$$

where $J_N$ is the number of junctions in the thermopile and $\alpha_{tav}$ is the Seebeck coefficient at the average temperature of the thermopile. The Seebeck coefficient can be determined from the relationship $$\alpha_{tav} = \alpha_{ts}\left(1 - Tco\left(\frac{T_H - T_C}{2} - T_S\right)\right) \quad (4)$$

where $\alpha_{ts}$ is the specified Seebeck coefficient at a particular specification temperature and $T_S$ is that specification temperature. Again, it can be seen that temperature compensation is based on the average thermopile temperature rather than just the cold junction temperature. By substituting equation (4) into equation (3) and solving for $T_H$, the hot junction temperature is found to be $$T_H = [(Tco*Ts+1) \pm [(Tco*Ts+1)^2 - (2*Tco)8$$
$$[(Tco((Tc*Ts) - (Tc^2/2)) + Tc + (V_S/J*\alpha_{ts})]^{\frac{1}{2}}]/Tco \quad (5)$$

The actual sensor output $V_S$ can be determined from the digital value available to the processor from the equation:

$$V_S = (H - H_o)\frac{K_{AD}}{G_{FE}} \quad (6)$$

where $K_{AD}$ is the analog-to-digital conversion factor in volts/bit and $G_{FE}$ is the gain of the front end amplifier.

Reference to the hot junction temperature rather than the cold junction temperature in each term of the relationship for determining the target temperature provides for much greater accuracy over a wide range of ambient temperatures and/or target temperatures.

To provide a temperature readout, the microprocessor makes the following computations: First the signal from thermistor RT1 is converted to temperature using a linear approximation. Temperature is defined by a set of linear equations $$y = M(x - xo) + b$$

where x is an input and xo is an input end point of a straight line approximation. The values of M, xo and b are stored in the EEPROM after calibration. Thus, to obtain a temperature reading from the thermistor, the microprocessor determines from the values of xo the line segment in which the temperature falls and then performs the computation for y based on the variables M and b stored in the EEPROM.

The hot junction temperature is computed A fourth power representation of the hot junction temperature is then obtained by a lookup table in the processor ROM.

The sensed radiation may be corrected using the gain calibration factor Kh, the sensor gain temperature coefficient Tco, the average of the hot and cold junction temperatures and a calibration temperature Tz stored in the EEPROM. The corrected radiation signal and the fourth power of the hot junction temperature are summed, and the fourth root is taken. The fourth root calculation is also based on a linear approximation which is selected according to the temperature range of interest for a particular unit. Again, the break points and coefficients for each linear approximation are stored in the EEPROM and are selected as required.

An additional factor based on ambient temperature may also be included as an adjustment. The temperature of the ear $T_e$ which is sensed by the thermopile is not actually the core temperature $T_{cr}$. There is thermal resistance between $T_{cr}$ and $T_e$. Further, there is thermal resistance between the sensed ear temperature and the ambient temperature. The result is a sense temperature $T_e$ which is a function of the core temperature of interest and the ambient temperature. Based on an assumed constant $K_C$ which is a measure of the thermal resistances between $T_{cr}$, $T_e$ and $T_a$, core temperature can be computed as $$T_{cr} = T_a + \frac{T_e - T_a}{k_c}$$

This computation can account for a difference of from one-half to one degree between core temperature and sensed ear temperature, depending on ambient temperature.

A similar compensation can be made in other applications. For example, in differential cutaneous temperature scanning, the significance of a given differential reading may be ambient temperature dependent.

The actual computations performed by the processor are as follows, where:
- H is the digital value of radiation signal presented to the processor
- $H_o$ is the electronic offset
- Hc is corrected H (deg $K^4$)
- Tc is ambient and cold junction temperature (deg F)
- Taf is 4th power of Tamb (deg $K^4$)
- Tt is target temperature (deg F)
- Tz is ambient temp during cal (deg F)
- Td is the displayed temperature
- Rt is the thermistor signal
- Kh is a radiation sensor gain cal factor
- Zt is a thermistor zero cal factor
- Th is the hot junction temperature
- $\alpha_{ts}$ is the Seebeck coefficient of the thermopile at a specified temperature
- J is the number of junctions in the thermopile
- Tco is a temperature coefficient for the Seebeck coefficient
- Ts is the temperature at which $\alpha_{ts}$ is specified
- Tcr is core temperature
- kc is a constant for computing core temperature
- $V_S$ is the sensor output voltage
- $G_{FE}$ is the gain of the front end amplifier
- $K_{AD}$ is the analog-to-digital conversion factor
- $V_S = (H - H_o)K_{AD}/G_{FE}$
- Tc(deg F) = Thermistor lookup table (Rt) − Zt
- $T_H = [(Tco*T_S+1) \pm [(Tco*T_S+1)^2 - (2*Tco)*[(Tco((Tc*Ts)-(Tc^2/2))+Tc+(V_S/J*\alpha_{ts})]]^{\frac{1}{2}}]/Tco$
- Hc(deg $K^4$) = Kh*(H−$H_o$)*(1+Tco*((Th−Tc)/2−Tz))
- Thf(deg $K^4$) = 4th power lookup table (Tc)
- Tt(deg F) = (Hc+Thf)$^{\frac{1}{4}}$ (Final lookup table)
- Tcr = Te+(Tt-Te)/kc
- Tt(deg C) = (5/9) * (Tf(deg F)−32) optional The following is a list of the information which may be contained in the EEPROM and therefore be programmable at the time of calibration:
- Radiation sensor offset
- Radiation sensor gain
- Radiation sensor temperature coefficient
- Thermistor offset
- Ambient temperature at calibration
- Thermistor lookup table
- Final temperature lookup table
- Adjustment factor F Sound source functions:
- Beep at button push in lock mode
  - none/20/40/80 milliseconds long
- Beep at lock
  - none/20/40/80 milliseconds long
- Beep at power down
  - none/20/40/80 milliseconds long
- Beep at lowbattery
  - none/20/40/80 milliseconds long
  - interval 1/2/3 sec
  - single/double beep Timeout functions:
- Time to power-down
  - 0.5 to 128 sec in 0.5 sec increments
- Delay until lock
  - 0.5 to 128 sec in 0.5 sec increments Other functions:
- Power-on button resets lock cycle
- Power-on button resets peak detect
- Display degrees C / degrees F
- EEPROM "Calibrated" pattern to indicate that the device has been calibrated
- EEPROM checksum for a self-check by the processor FIGS. 4A–4D provide a flowchart of the firmware stored in the microprocessor 73. From reset when the instrument is turned on, the system is initialized at 110 and the contents of the EEPROM are read into memory in the microprocessor at 112. At 114 the processor reads the state of power and mode switches in the system. At 116, the system determines whether a mode switch 113 has placed the system in a self-test mode. If not all eights are displayed on the four-digit display 82 for a brief time At 120 the system performs all A-to-D conversions to obtain digital representations of the thermopile output and the potentiometer settings through multiplexor 76.

The system then enters a loop in which outputs dictated by the mode switch are maintained. First the timers are updated at 122 and the switches are again read at 124. When the power is switched off, from 126 the system enters a power down loop at 128 until the system is fully down. At 130, the mode switch is checked and if changed the system is reset. Although not in the tympanic temperature detector, some detectors have a mode switch available to the user so that the mode of operation can be changed within a loop.

At 132, 136 and 140, the system determines its mode of operation and enters the appropriate scan process 134, lock process 138 or peak process 142. In a scan process, the system updates the output to the current reading in each loop. In a lock process, the system updates the output but locks onto an output after some period of time. In the peak process, the system output is the highest indication noted during a scan. In each of these processes, the system may respond to the programming from the EEPROM to perform any number of functions as discussed above. In the peak process which is selected for the tympanic temperature measurement, the system locks onto a peak measurement after a preset period of time. During assembly, the system may be set at a test mode 144 which will be described with respect to FIG. 4D.

In any of the above-mentioned modes an output is calculated at 146. Then the system loops back to step 122. The calculation 146 is illustrated in FIG. 4B.

Figure 4A:
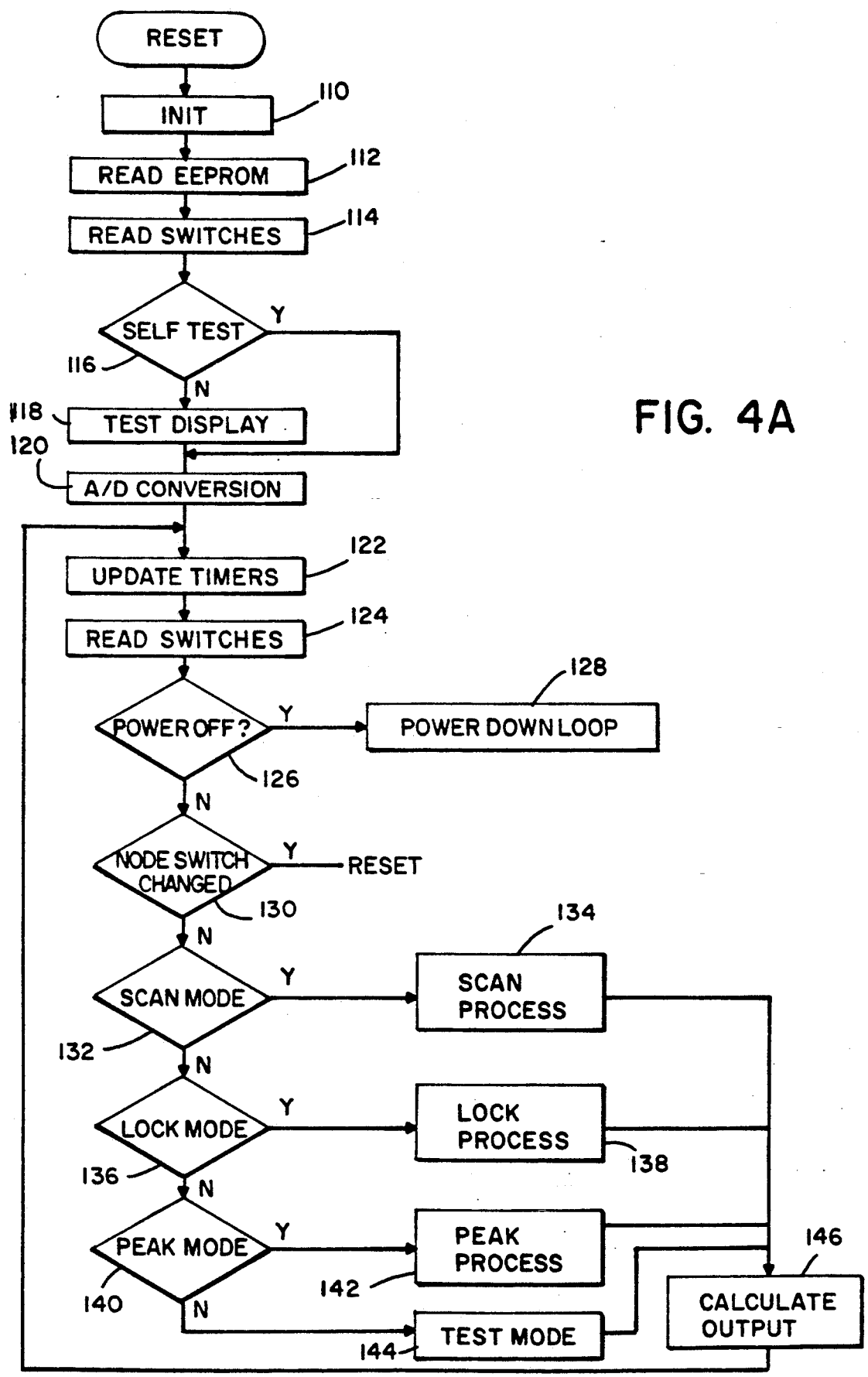
FIGS. 4A-4D are flow charts of the system firmware.
Figure 4B:
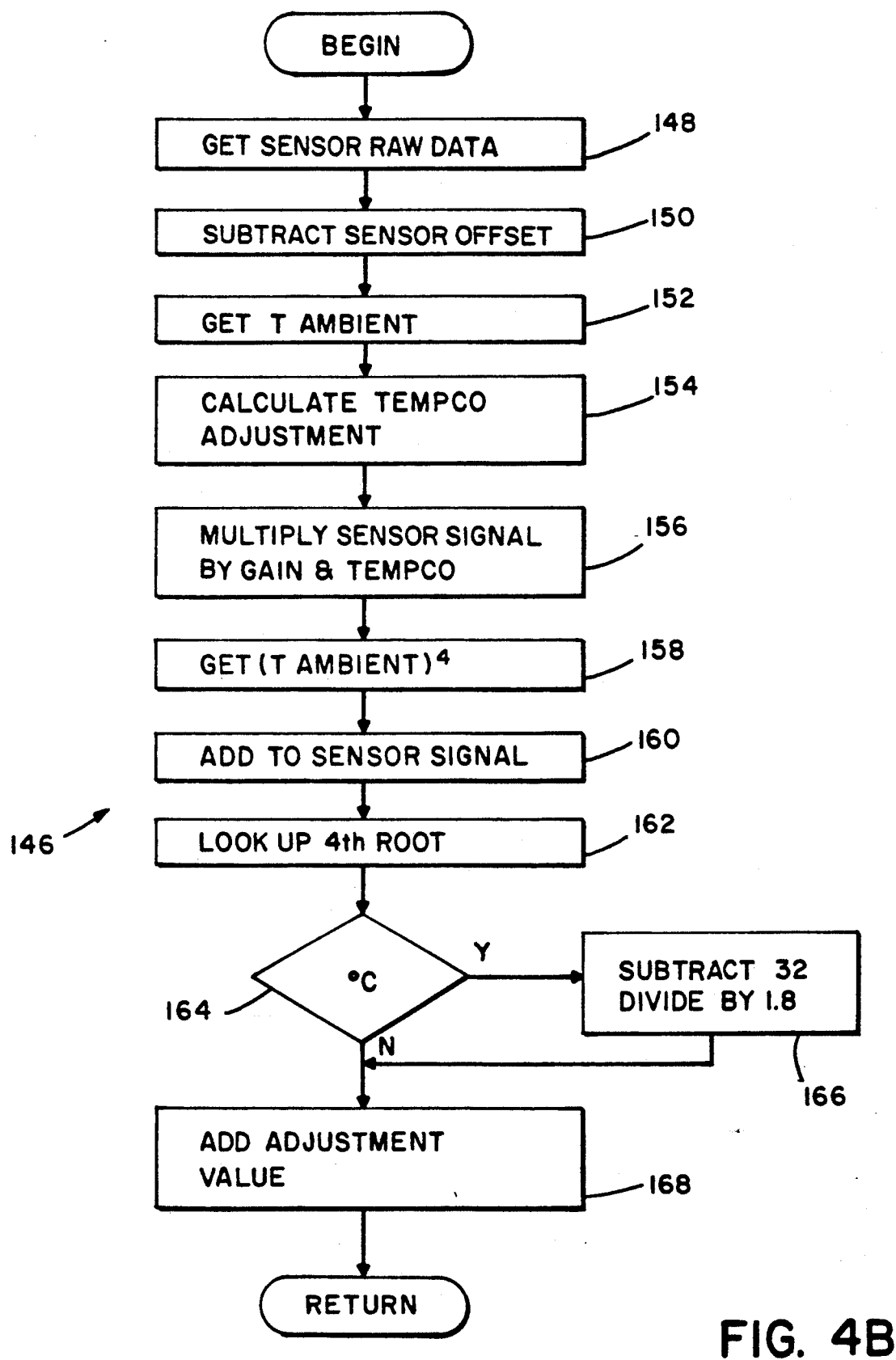

At 148 in FIG. 4B the raw sensor data is obtained from memory. The sensor offset taken from the EEPROM is subtracted at 150 and the ambient temperature previously obtained from the potentiometer RT1 is accessed at 152. The temperature coefficient adjustment is calculated at 154. At 156, the sensed signal is multiplied by the gain from EEPROM and by the temperature coefficient. At 158, the fourth power of the ambient temperature is obtained, and at 160 it is added to the sensor signal. At 162, the fourth root of the sum is obtained through a lookup table. Whether the display is in degrees centigrade or degrees Fahrenheit is determined at 164. If in degrees centrigrade, a conversion is performed at 166. At 168, adjustment values, including that from the potentiometer R4, are added.

Figure 4C:
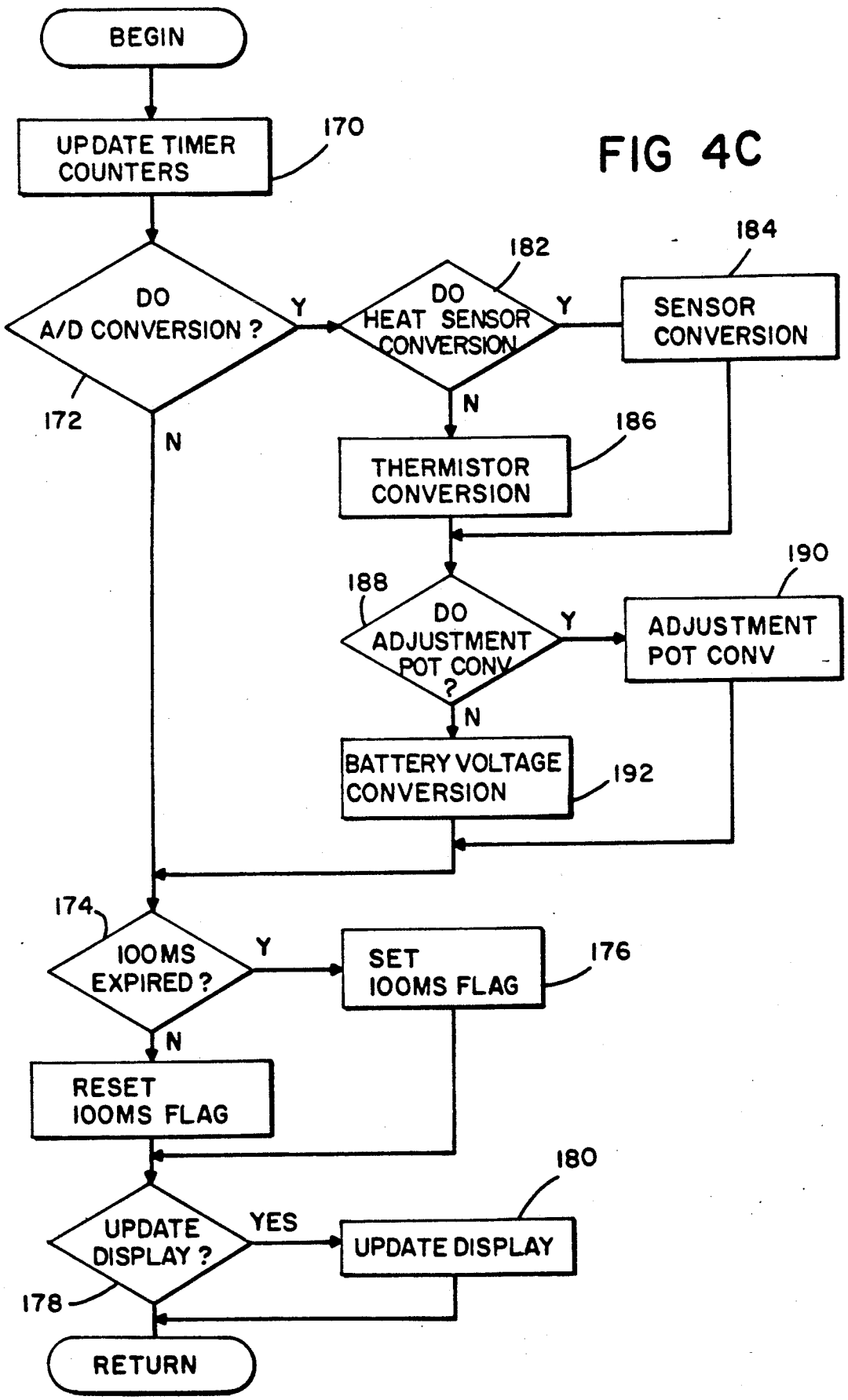

Analog-to-Digital conversion is performed periodically during an interrupt to the loop of FIG. 4A which occurs every two milliseconds. The interrupt routine is illustrated in FIG. 4C. Timer counters are updated at 170. A-to-D conversions are made from 172 only every 100 milliseconds when a flag has been set in the prior interrupt cycle. During most interrupts, an A/D conversion does not occur. Then, the 100-millisecond counter is checked at 174, and if the count has expired, a flag is set at 176 for the next interrupt. The flag is checked at 178 and, if found, the display is updated at 180. The system then returns to the main loop of FIG. 4A.

Where the 100 millisecond flag is noted at 172 an A-to-D conversion is to be performed. The system first determines at 182 whether a count indicates there should be a conversion of the thermopile output at 184 or a conversion of the the thermistor output at 186. The thermopile sensor conversion is performed nine out of ten cycles through the conversion loop. At 188, the system checks to determine whether a conversion is made from the potentiometer R4 or from the battery voltage divider R1, R2 at 192. These conversions are made alternately.

Figure 4D:
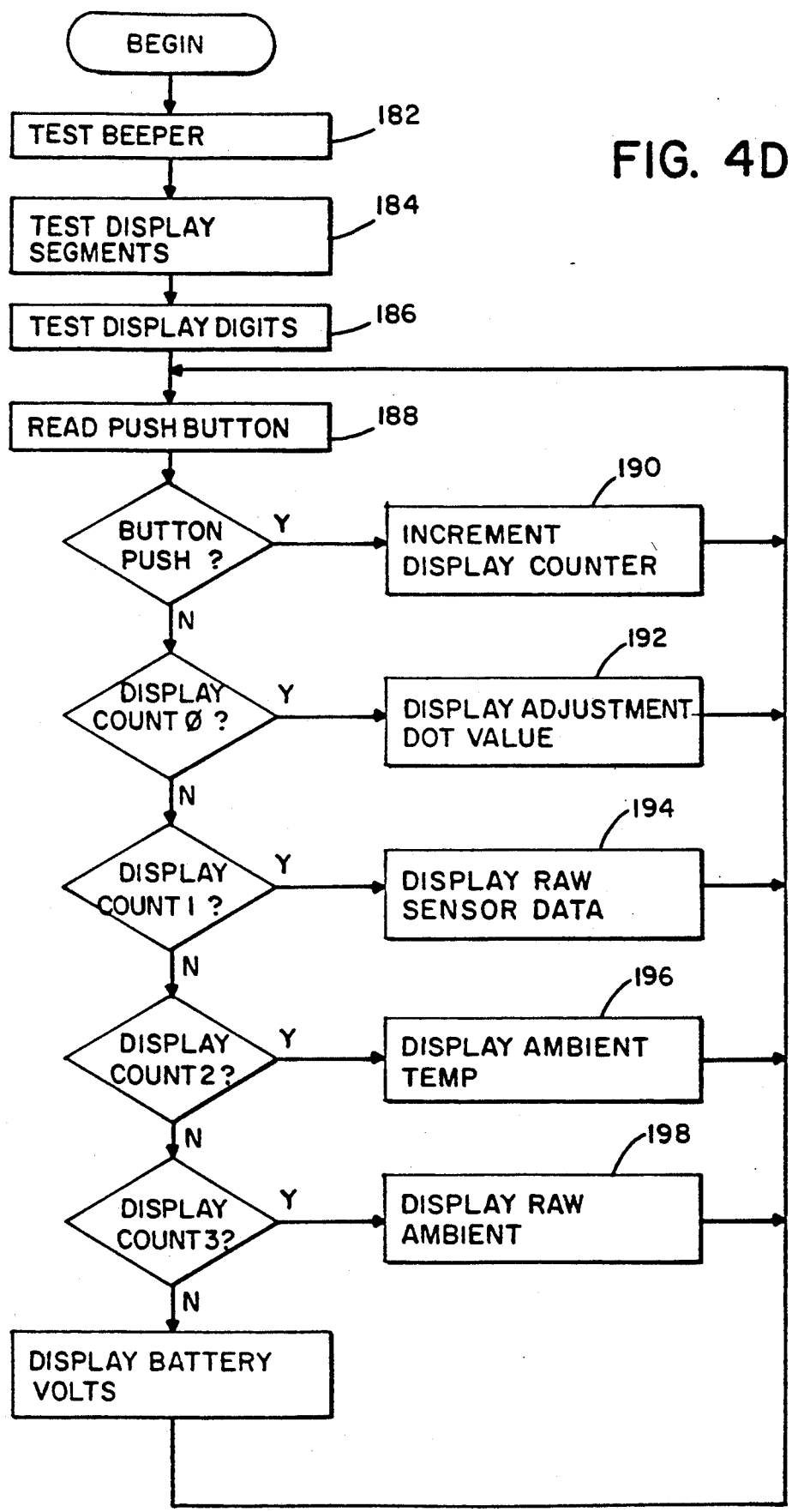

FIG. 4D illustrates the self-test sequence which is called by the mode switch 113 only during assembly. During the test, the beeper sounds at 182 and all display segments are displayed at 184. Then the system steps each character of the display from zero through nine at 186. The system then enters a test loop. At 188, the system senses whether the button 108 has been pressed. If so, a display counter is incremented at 190. The display for the unit then depends on the count of the display counter. With the zero count, the adjustment potentiometer value is displayed at 192. Thereafter, if the display counter is incremented by pressing the button 108, the raw sensor data is displayed. With the next increment, ambient temperature is displayed at 196, and with the next increment, the raw output from the ambient temperature sensor RT1 is displayed. With the next increment, the battery voltage is displayed. After the test, the assembler sets the mode switch to the proper operating mode.

While this invention has been particularly shown and described with references to preferred embodiments thereof, it will be understood by those skilled in the art that various changes in form and details may be made therein without departing from the spirit and scope of the invention as defined by the appended claims.

We claim:

1. A temperature detector comprising:
   a housing adapted to be held by hand;
   an extension from the housing adapted to be inserted into an ear;
   a radiation sensor supported within the detector and which receives radiation passing into the extension from a target area in the ear;
   a temperature display on the housing for displaying temperature; and
   a battery powered electronics in the housing for converting radiation sensed by the sensor to temperature displayed by the display, the electronics including a processor for providing an inner body temperature displayed on the housing as a function of the received radiation, indicating target temperature, compensated by an indication of ambient temperature to provide an inner body temperature approximation.

2. A temperature detector as claimed in claim 1 wherein the inner body temperature is core temperature.

3. A radiation detector comprising:
   a radiation sensor mounted to view a target of biological surface tissue;
   a temperature sensor for sensing ambient temperature;
   an electronic circuit coupled to the radiation sensor and temperature sensor and responsive to a signal from the radiation sensor and the temperature sensed by the temperature sensor to provide an indication of an internal temperature adjusted for the ambient temperature to which the surface tissue is exposed; and
   an output for providing an indication of the internal temperature.

4. A radiation detector as claimed in claim 3 wherein the output is a display.

5. A radiation detector as claimed in claim 3 wherein the biological surface tissue includes a tympanic membrane and the display provides an indication of core temperature.

* * * * *

(12) EX PARTE REEXAMINATION CERTIFICATE (5861st)
United States Patent
Pompei et al.

(10) Number: US 5,199,436 C1
(45) Certificate Issued: Aug. 21, 2007

(54) RADIATION DETECTOR HAVING IMPROVED ACCURACY

(75) Inventors: Francesco Pompei, Wellesley Hills, MA (US); Philip R. Gaudet, Jr., Concord, MA (US)

(73) Assignee: PNC Bank, National Association, Pittsburgh, PA (US)

Reexamination Request:
No. 90/007,951, Feb. 24, 2006

Reexamination Certificate for:
Patent No.: 5,199,436
Issued: Apr. 6, 1993
Appl. No.: 07/646,855
Filed: Jan. 28, 1991

Related U.S. Application Data

(60) Division of application No. 07/338,968, filed on Apr. 14, 1989, now Pat. No. 5,012,813, which is a continuation-in-part of application No. 07/280,546, filed on Dec. 6, 1988, now Pat. No. 4,993,419.

(51) Int. Cl.
*A61B 6/00* (2006.01)
*A61B 5/00* (2006.01)

(52) U.S. Cl. .......................................... 600/474; 600/549
(58) Field of Classification Search .................. None
See application file for complete search history.

(56) References Cited

U.S. PATENT DOCUMENTS

| 2,710,559 | A | 6/1955 | Heitmuller et al. |
|---|---|---|---|
| 2,984,747 | A | 5/1961 | Walker |
| 3,374,354 | A | 3/1968 | Hood |
| 3,781,837 | A | 12/1973 | Anderson et al. |
| 4,302,971 | A | 12/1981 | Luk |
| 4,317,998 | A | 3/1982 | Dore |
| 4,854,730 | A | 8/1989 | Fraden |
| 4,895,164 | A | 1/1990 | Wood |
| 4,907,895 | A | 3/1990 | Everest |
| 4,993,419 | A | 2/1991 | Suszynski |
| 5,012,813 | A | 5/1991 | Pompei et al. |
| 5,199,436 | A | 4/1993 | Pompei et al. |
| 5,293,877 | A | 3/1994 | O'Hara et al. |
| 5,325,863 | A | 7/1994 | Pompei |
| 5,381,796 | A | 1/1995 | Pompei |
| 5,445,158 | A | 8/1995 | Pompei |
| 5,653,238 | A | 8/1997 | Pompei |
| 6,047,205 | A | 4/2000 | Pompei |
| 6,292,685 | B1 | 9/2001 | Pompei |
| 2002/0026119 | A1 | 8/2001 | Pompei |

FOREIGN PATENT DOCUMENTS

| EP | 0 447 455 B1 | 5/1997 |
|---|---|---|
| EP | 0 763 349 B1 | 8/2002 |
| JP | 55-11597 | 1/1980 |
| JP | 55-011597 | 1/1980 |
| JP | 58-88627 | 5/1983 |
| WO | WO 90/06090 | 6/1990 |
| WO | WO 98/08431 | 3/1998 |
| WO | WO 00/16051 | 3/2000 |

OTHER PUBLICATIONS

"A simple but interesting history of Infrared Thermometers," Version 017, www.ZyTemp.com.

(Continued)

*Primary Examiner*—Beverly M. Flanagan

(57) ABSTRACT

Tympanic temperature measurements are obtained from the output of a thermopile mounted in an extension from a housing. The housing has a temperature display thereon and supports the electronics for responding to sensed radiation. The thermopile is mounted in a highly conductive can which includes a radiation guide and thermal mass. The guide provides a narrow field of view due to a fairly high emissivity. Electronics determine the target temperature as a function of the temperature of the hot junction of the thermopile determined from the cold junction temperature and a thermopile coefficient. The tympanic temperature is adjusted to provide an indication of core temperature.

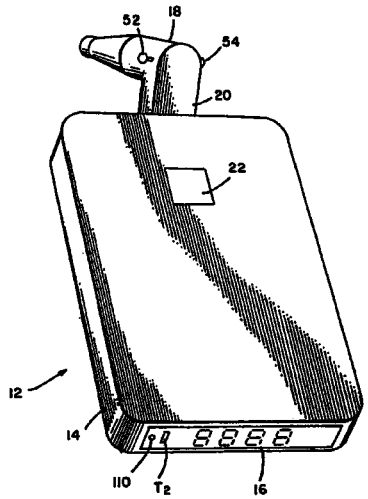

OTHER PUBLICATIONS

"Human Body Temperature: Its Measurement and Regulation," Y. Houdas and E.F.J. Ring, Penum Press, 1982.

"Infrared Thermocouples," article appearing at www.omega.com website.

"Noncontact Temperature Sensing with Thin Film Thermopile Detectors," by Condrad Hamel, Sensors, pp. 29–31 (Jan. 1989).

"Standard Specification for Infrared Thermometers for Intermittent Determination of Patient Temperature," *American Society for Testing and Materials, Designation E 1965–98*, pp. 1–16 (1998).

"The Encyclopedia of Electronics," Second Printing, edited by Charles Susskind, Reinhold Publishing Corporation, New York, pp. 260, 856–857, 864 (1967).

"The Equine Infrared Thermographic Scanner: Assuring Performance of the Equine Athlete . . . at the Speed of Light," Equine Infrared, by Marybeth Ryan.

"Thermal Sensors Based on the Seebeck Effect," A. W. Herwaarden and P.M. Sarro, Sensors and Actuators, 10(1986) pp. 321–346.

"Thermography as an Indicator of Blood Perfusion," by Tom J. Love, Annals, NY Academy of Sciences, pp. 429–437 (1980).

Det Tronics advertisement, Intech, p. 48, Oct. 1987.

Exergen Product Specification for "MicroScanner™ E Autozero".

FirstTemp™ Intelligent Medical Systems, Operation Manual, Model 2000A, pp. 1–7, Undated.

Omega Medical Product Specification for Surface Termperature Scanner STS–100–F/C & 101–C, by Omega Medical Product Corporation.

Principles and Methods of Termperature Measurement, Thomas D. McGee, John Wiley & Sons, Inc., Publishers, pp. 237–239, 251–252, 257–258, 265–266, 296–298, 302, 334–336,373–374,393–395 (1988).

Sketch of Radiation Detector manufactured by IR–ONICS Corp. and distributed by Dermathorm Corp.

"Thermometry," James F. Schooley, Ph. D, CRC Press, Boca Raton, Florida, pp. 148–151, 172–183.

User Manual for "Surface Temperature Scanner STS–100–F/C & 101–C", Omega Medical Corporation.

Exergen Corporation Product Advertisement for "Exergen EHS Infrared Scanner".

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–5 is confirmed.

* * * * *